J. F. CURRIVAN.
LOADING APPLIANCE FOR VEHICLES.
APPLICATION FILED APR. 30, 1917.
1,288,844.
Patented Dec. 24, 1918.
2 SHEETS—SHEET 1.
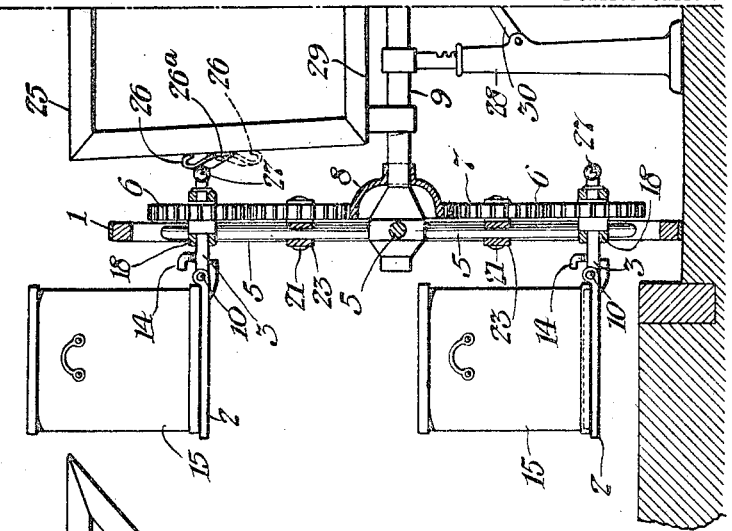
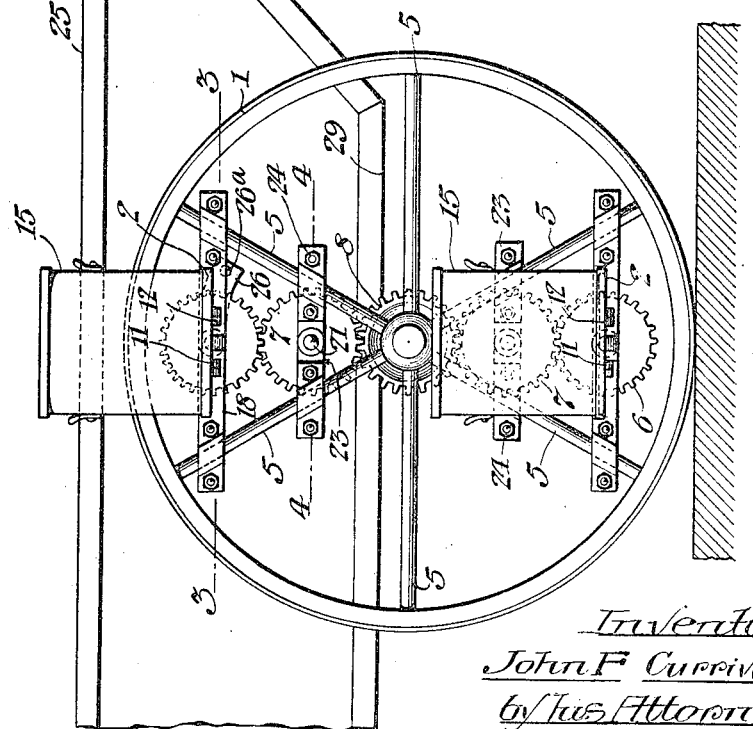
Inventor
John F Currivan
by his Attorney J. F. CURRIVAN.
LOADING APPLIANCE FOR VEHICLES.
APPLICATION FILED APR. 30, 1917.
1,288,844.
Patented Dec. 24, 1918.
2 SHEETS—SHEET 2.
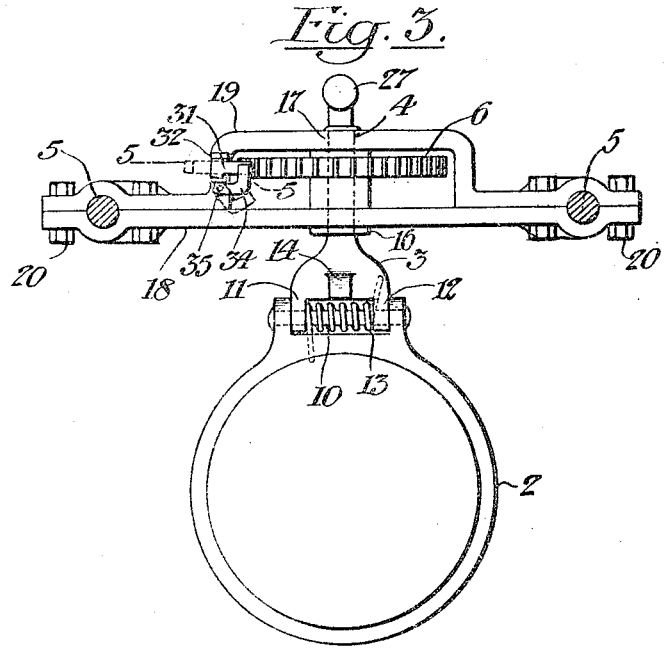
Inventor:
John F. Currivan.
by his Attorney

UNITED STATES PATENT OFFICE.

JOHN F. CURRIVAN, OF BROOKLYN, NEW YORK, ASSIGNOR OF THIRTY ONE-HUNDREDTHS TO J. HOWARD STANNARD, OF NEW YORK, N. Y.

LOADING APPLIANCE FOR VEHICLES.

1,288,844. Specification of Letters Patent. Patented Dec. 24, 1918.

Application filed April 30, 1917. Serial No. 165,429.

*To all whom it may concern:*

Be it known that I, JOHN F. CURRIVAN, a citizen of the United States of America, and resident of Brooklyn, in the county of Kings and State of New York, have invented certain new and useful Improved Loading Appliances for Vehicles, of which the following is a specification.

This invention relates to loading appliances for vehicles, which are adapted to be attached to the wheels thereof and to be operated by the rotation of the wheels so as to convey or raise the material from the ground or other level into position for being emptied or dumped into the body of the vehicle.

The improved appliance is especially adapted for use with garbage and similar carts which make house to house collections or gather rubbish from bins or receptacles placed along public thoroughfares. It will be understood, however, that the device is capable of general application and may equally well be employed with other types of vehicles.

One of the objects of the invention is to provide a device of sturdy construction which may be readily applied to a vehicle and which enables the loading of the vehicle to be effected with the minimum of labor on the part of the driver or attendant of the vehicle.

A further object is to provide a device of this character, whereof the platform supporting the load is adapted to be maintained level automatically during the angular displacement of the wheel so that the load thereon may be raised or lifted without danger of being upset. This result may be effected through the intervention of an epicyclic or sun and planet gear whereof the sun wheel is rigidly secured to the stationary axle of the cart and the planet wheels rotatably mounted on the road wheel of the cart to which the loading device is applied.

A further object is to provide a lifting appliance which may be operated by the rolling of the vehicle wheel over the roadway or the rotation thereof when it is jacked up from the surface of the roadway. In order to prevent retrograde movement of the road wheel when it is used in the jacked condition, a pawl or similar device may be applied to one or other of the gear wheels of the epicyclic gear.

Another object is to provide a device which will be brought to rest in the unloading position so as to prevent the same being carried beyond the position by the rotation of the wheel.

A still further object is to provide a loading appliance which is capable of being readily thrown out of operation and which will not project out from the vehicle or in any way hamper the general use thereof.

In order that the said invention may be clearly understood and readily carried into effect, the same will now be described more fully with reference to the accompanying drawings, in which:—

Figure 1 is an elevation of part of a cart or vehicle showing two of the improved loading appliances attached to one of the wheels thereof.

Fig. 2 is an end view of the vehicle showing the wheel thereof in section.

Fig. 3 is a detail plan view of the load supporting platform of the appliance showing the method of mounting the same on the road wheel of the vehicle.

Fig. 4 is a plan view of the intermediate gear wheel of the epicyclic gear of the appliance and the method of supporting the same on the spokes of the road wheel of the vehicle.

Fig. 5 is a sectional view showing the device for preventing retrograde movement of the appliance when the road wheel of the vehicle is jacked.

Referring to Figs. 1 and 2, the road wheel 1 of the vehicle has two of the improved appliances mounted thereon. Each appliance comprises a platform 2 which is hinged to the flattened end 3 of a spindle 4 rotatably mounted on the spokes 5 of the road wheel. The spindle 4 carries a gear wheel 6 which is rigidly secured thereon and adapted to mesh with another gear wheel 7 rotatably mounted on the spokes 5 and which in turn meshes with an annular gear wheel 8 fixed on the stationary axle 9 of the vehicle. The wheels 6, 7 and 8 constitute an epicyclic gear, 8 being the sun wheel and 6 and 7 the planet wheels rotating around the same. The gear wheels 6 and 8 are provided with the same number of teeth and the arrangement is such that as the road wheel 1 is rotated the platform 2 is always maintained level or in the horizontal position. If desired, only one of the improved appliances may be attached to the road wheel but in order to obtain a balanced structure and thereby facilitate the operation, it is advisable to provide two thereof so arranged that the platforms are diametrically opposed.

The method of maintaining the platform 2 on the flattened end of the spindle 4 is clearly shown in Fig. 3, and it will be observed that said platform is pivoted on a spindle 10 which is carried by two lugs 11 and 12 formed on the flattened end 3 of the spindle 4.

A spiral spring 13 is arranged on the spindle 10 and has its respective ends bearing against the platform 2 and the flattened end 3. The spring 13 normally tends to retain the platform in the vertical position against a stop 14 on the flattened end 3 of spindle 4 and when the platform is turned down to the horizontal position shown in the drawings, said spring will be placed under tension so that when the platform is released, the spring will return it to the original position against the stop 14. When a garbage can or receptacle 15 is to be placed on the platform, the driver or attendant has to turn the same down against the action of the spring 13 but so soon as the can is in position the weight thereof will prevent the return of the platform. So soon as the weight is removed, the platform will automatically return to the vertical position so as not to project beyond the hub of the road wheel. The spindle 4 is journaled in bearings 16 and 17 formed respectively in members 18 and 19 straddling adjacent spokes 5 of the road wheel and securely attached thereto by means of bolts 20.

The intermediate gear wheel 7 is rotatably mounted on a spindle or pin 21 carried by a member 22 which is clamped to the spokes 5, as shown in Fig. 4, by means of clamp plates 23 secured thereto by bolts or studs 24.

It will be understood that the can or other receptacle is placed upon the platform 2 when the latter is in its lowest position and as the road wheel rotates the platform will be brought to the highest position so that the can 15 may be readily tilted and the contents thereof dumped or emptied in the body 25 of the vehicle.

In order to facilitate the emptying of the can 15, the improved loading appliance is adapted to be retarded as the platform thereof approaches the dumping position, and this may be effected by means of a gradually inclined arcuate spring 26 attached to the vehicle body 25. The spindle 4 supporting the planet wheel 6 of the epicyclic gear extends beyond its inner bearing and is provided with a protuberance 27 which is adapted to engage with the inclined arcuate spring and coact therewith to retard the movement of the road wheel as said spindle 4 approaches the uppermost position. This retarding action will be graduated and will reach the maximum value when the platform is in the dumping position, and may be sufficient to lock the wheel in this position.

It will be understood that the road wheel 1 may be rotated to lift the load by drawing the vehicle in the ordinary way or the wheel may be jacked and turned manually when the vehicle is at rest. The method of using the appliance will depend upon the character of the work and the location of the material to be loaded.

In order to permit the appliance to be used when the vehicle is at rest, a jack 28 is slung on the axle 9 of the vehicle. This jack is normally raised from the roadway and attached to the bottom 29 of the vehicle body in any suitable manner. When the road wheel is to be raised, the jack is released and swung down under the axle 9 so that when the lever 30 thereof is operated, the wheel will be raised from the roadway. The platform will be loaded in the manner hereinbefore described and the angular displacement thereof will be effected by the driver or attendant pulling on the felly thereof. Should the weight to be raised be very heavy, a lever or other device may be applied to the felly to obtain additional purchase or leverage. As the road wheel will have a tendency to make retrograde movement when used in this way, a pawl or similar device 31, Figs. 3 and 5, may be provided for locking one of the wheels of the epicyclic gear. In the arrangement shown, the pawl 31 is pivoted between lugs 32, 33 on the member 19 supporting the spindle of the planet wheel 6. A spring 34 is adapted to bear against the back of the pawl and retain the same in engagement with the wheel 6. The spring 34 is pivoted at 35 on the member 19 and is adapted to be turned aside to permit of the pawl being thrown into the inoperative position shown in broken lines. After the pawl has been moved into this position, the spring 34 may be turned to bridge the lugs 32, 33 and prevent the pawl returning and engaging with the wheel 6. It will be seen that the pawl permits the road wheel to turn in one direction but effectively prevents the same from movement in the opposite direction owing to its locking action on the epicyclic gear.

When the vehicle has been loaded, the pawl 31 is turned into the disengaged position and the retarding spring 26 on the vehicle body turned on its pivot 26ª to assume the position shown in broken lines in Fig. 2 out of the path of the protuberance 27 of the planet wheel spindle. The road wheel 1 is then free to turn without obstruction and owing to the mounting of the platform 2 it will be retained in the vertical position against the stop 14. Instead if employing a spring for normally retaining the platform in the vertical position, a counterweight or other device may be provided for this purpose. One or more of the improved loading appliances may be arranged on a road wheel and they would all be associated with and rotate around the central sun wheel 8.

It will be understood that the details of construction may be modified without departing from the spirit of the invention which is outlined in the appended claims.

I claim:

1. In a loading appliance for vehicles, the combination with a spoked vehicle wheel of a load receiving platform carried by the spokes thereof, a stationary axle for said wheel, a gear wheel rigidly mounted on said axle and constituting the sun wheel of an epicyclic gear, planet wheels rotating around said sun wheel and operatively connected with the said load receiving platform to retain the same in horizontal position during the rotation of the vehicle wheel.

2. In a loading appliance for vehicles, the combination with a spoked road wheel of a stationary axle therefor, a gear wheel rigidly mounted on said axle, a pair of meshing gear wheels carried by the spokes of said road wheel, the inner wheel of the pair being meshed with the gear wheel secured to the axle of the road wheel and the outer gear wheel being rigidly mounted on a spindle rotatably mounted on the spokes of the road wheel and having the same number of teeth as the gear wheel on the stationary axle of the road wheel, a load-receiving platform pivoted at one end of said spindle and means for normally retaining said platform in a plane substantially parallel with the plane of the road wheel.

3. In a loading appliance for vehicles, the combination with a spoked road wheel, of a stationary axle therefor, a gear wheel rigidly mounted thereon and constituting the sun wheel of an epicyclic gear, planet wheels rotating around said sun wheel and operatively connected with a load-receiving platform to retain the same in the horizontal position during the rotation of the road wheel, and a spring for retarding the movement of the road wheel as the platform thereon approaches the load discharging position.

4. In a loading appliance for vehicles, the combination with a spoked road wheel, of a stationary axle therefor, a gear wheel rigidly mounted thereon and constituting the sun wheel of an epicyclic gear, planet wheels rotating around said sun wheel, a load-receiving platform operatively connected with said planet wheels so as to be retained in the horizontal position during the rotation of the road wheel, means for preventing retrograde movement of said road wheel, and a spring for retarding the movement of said road wheel as the platform thereon approaches the load discharging position.

5. In a loading appliance for vehicles, the combination with a spoked road wheel, of a stationary axle therefor, a gear wheel rigidly mounted thereon and constituting the sun wheel of an epicyclic gear, planet wheels rotating around said sun wheel, a load-receiving platform operatively connected with said planet wheels so as to be retained in a horizontal position during the rotation of the road wheel, a pawl engaging with one of said planet wheels so as to prevent retrograde movement thereof, and a spring for retarding the motion of said road wheel as the platform thereon approaches the load discharging position.

6. In a loading appliance for vehicles, the combination with a spoked road wheel, of a stationary axle therefor, a gear wheel rigidly mounted thereon and constituting the sun wheel of an epicyclic gear, planet wheels rotating around said sun wheel, a load-receiving platform operatively connected with said planet wheels so as to be retained in a horizontal position during the rotation of the road wheel, a pawl engaging with one of said planet wheels to prevent retrograde movement thereof, a spring for retaining said pawl in engagement with said planet wheel and a device for retarding the movement of the road wheel as the platform thereof approaches the load discharging position.

7. In a loading appliance for vehicles, the combination with a spoked road wheel, of a stationary axle therefor, a gear wheel rigidly mounted thereon and constituting the sun wheel of an epicyclic gear, planet wheels rotating around said sun wheel, a spindle rigidly connected to one of said planet wheels, a platform hinged at one end of said spindle, said planet wheels coöperating with the sun wheel to retain the load-receiving platform in the horizontal position during the rotation of the road wheel.

8. In a loading appliance for vehicles, the combination with a spoked road wheel, of a stationary axle therefor, a gear wheel rigidly mounted thereon and constituting the sun wheel of an epicyclic gear, a plurality of planet wheels rotating around said sun wheel, spindles for said planet wheels rotatably mounted on the spokes of the road wheel, a load-receiving platform pivoted at one end of each of the said spindles, and a device for retarding the movement of the road wheel as one or other of the platforms thereon approaches the load discharging position.

9. In a loading appliance for vehicles, the combination with a spoked road wheel, of a stationary axle therefor, a gear wheel rigidly mounted thereon and constituting the sun wheel of an epicyclic gear, a plurality of planet wheels rotating around said sun wheel, spindles for said planet wheels rotatably mounted on the spokes of said road wheel, load-supporting platforms, each pivoted at one end of said spindles, means for normally retaining said platforms in a plane substantially parallel to the plane of the road wheel and a device for retarding the movement of the road wheel as one or other of the platforms thereon approaches the load discharging position.

10. In a loading appliance for vehicles, the combination with a spoked road wheel, of a stationary axle therefor, a gear wheel rigidly mounted thereon and constituting the sun wheel of an epicyclic gear, a plurality of planet wheels rotating around said sun wheel, spindles for said planet wheels rotatably mounted on the spokes of the road wheel, platforms pivoted to one end of each of said spindles, a jack slung on the axle of the road wheel of the vehicle, devices for maintaining the platforms in a plane substantially parallel with the plane of the road wheel, protuberances on the spindles of the planet wheels and a device for engaging therewith to retard the movement of the road wheel as one or other of the platforms thereon approaches the load discharging position.

JOHN F. CURRIVAN.

Witnesses:
JOHN J. CURRIVAN,
J. HOWARD STANNARD.

Copies of this patent may be obtained for five cents each, by addressing the "Commissioner of Patents, Washington, D. C."